US011580522B2

(12) United States Patent
Douglas et al.

(10) Patent No.: US 11,580,522 B2
(45) Date of Patent: Feb. 14, 2023

(54) BATTERYLESS PAYMENT DEVICE WITH WIRELESSLY POWERED TOKEN PROVISIONING

(71) Applicant: CAPITAL ONE SERVICES, LLC, McLean, VA (US)

(72) Inventors: Lawrence Douglas, McLean, VA (US); Paul Y. Moreton, Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 601 days.

(21) Appl. No.: 15/444,229

(22) Filed: Feb. 27, 2017

(65) Prior Publication Data
US 2017/0249628 A1    Aug. 31, 2017

Related U.S. Application Data

(60) Provisional application No. 62/300,954, filed on Feb. 29, 2016.

(51) Int. Cl.
*G06Q 20/32* (2012.01)
*G07F 7/08* (2006.01)
(Continued)

(52) U.S. Cl.
CPC ....... *G06Q 20/3278* (2013.01); *G06Q 20/349* (2013.01); *G06Q 20/352* (2013.01);
(Continued)

(58) Field of Classification Search
CPC ............. G06Q 20/3278; G06Q 20/349; G06Q 20/352; G06Q 20/3672; G07F 7/084; G06K 7/10158
See application file for complete search history.

(56) References Cited

U.S. PATENT DOCUMENTS

| 8,463,185 | B2 * | 6/2013 | Edmonson | ............ G01S 13/755 333/150 |
| 9,100,493 | B1 * | 8/2015 | Zhou | ................. H04M 1/72522 |
| 9,864,882 | B1 * | 1/2018 | Geist | ................. G06K 7/10158 |

(Continued)

OTHER PUBLICATIONS

I. Lacmanović, B. Radulović and D. Lacmanović, "Contactless payment systems based on RFID technology," The 33rd International Convention MIPRO, 2010, pp. 1114-1119. (Year: 2010).*

*Primary Examiner* — Daniel S Felten
*Assistant Examiner* — Kevin T Poe
(74) *Attorney, Agent, or Firm* — Perkins Coie LLP (57) ABSTRACT

A batteryless payment device is disclosed. According to certain embodiments, the batteryless payment device may include a first communication system and a second communication system, the second communication system being a near-field-communication (NFC) system. The batteryless payment device may also include a power receiver coupled to the first communication system and configured to wirelessly receive power from an external device for powering the first communication system. The batteryless payment device may further include a controller configured to: when the first communication system is powered, establish, via the first communication system, a first wireless connection with a user device; receive, through the first wireless communication, a token from the user device; establish, via the second communication system, a second wireless connection with a payment terminal; and transmit, through the second wireless connection, the token to the payment terminal.

18 Claims, 5 Drawing Sheets

(51) Int. Cl.
  *G06Q 20/34* (2012.01)
  *G06Q 20/36* (2012.01)
  *G06K 7/10* (2006.01)

(52) U.S. Cl.
  CPC ......... *G06Q 20/3672* (2013.01); *G07F 7/084* (2013.01); *G06K 7/10158* (2013.01)

(56) References Cited

U.S. PATENT DOCUMENTS

| | | | |
|---|---|---|---|
| 2007/0077896 A1* | 4/2007 | Ho | G07B 15/06 455/78 |
| 2010/0091995 A1* | 4/2010 | Chen | H04L 9/0863 380/278 |
| 2011/0043327 A1* | 2/2011 | Baarman | H02J 50/10 340/10.34 |
| 2013/0124346 A1* | 5/2013 | Baldwin | G06Q 20/20 705/16 |
| 2014/0064258 A1* | 3/2014 | Montag | H04W 84/12 370/338 |
| 2014/0279472 A1* | 9/2014 | Caglayan | G06Q 20/10 705/41 |
| 2015/0039494 A1* | 2/2015 | Sinton | G06Q 20/327 705/39 |
| 2015/0100495 A1* | 4/2015 | Salama | G06Q 20/405 705/65 |
| 2015/0161594 A1* | 6/2015 | Jarman | G06Q 20/3278 705/41 |
| 2015/0254655 A1* | 9/2015 | Bondesen | G06Q 20/36 705/72 |
| 2017/0091764 A1* | 3/2017 | Lloyd | G06Q 20/3224 |
| 2017/0093463 A1* | 3/2017 | Wang | H04B 5/0037 |
| 2019/0005494 A1* | 1/2019 | Hammad | G06Q 20/3829 |

* cited by examiner

BATTERYLESS PAYMENT DEVICE WITH WIRELESSLY POWERED TOKEN PROVISIONING

RELATED APPLICATIONS

This application claims priority from U.S. Provisional Patent Application No. 62/300,954, filed on Feb. 29, 2016, the entire disclosure of which is incorporated by reference in the present application.

TECHNICAL FILED

The present disclosure relates to a batteryless payment device with wirelessly powered token provisioning. In particular, the present disclosure provides a system and method for wirelessly powering the batteryless payment device to form wireless communication with other devices, such that a token can be provisioned to the payment device through the wireless communication.

BACKGROUND

Many forms of mobile payments are available to consumers today. While traditional methods such as cash and magnetic-stripe based credit/debit cards remain popular, many consumers also use new forms of payment made available via electronic computing devices. For example, many mobile payment devices, such as a chip-based credit/debit card, a fob, or a smart wristband, contain near-field communication (NFC) capability, which allows a payment to be initiated when a mobile payment device is placed into close proximity with a payment terminal containing an NFC reader. The payment terminal obtains, via the NFC reader, payment account information from the mobile payment device, and then communicates with an appropriate financial network or other back-end processing system(s) to authorize the transaction.

A payment token is a unique digital identifier encoding and/or encrypting the payment account information, e.g., account number and/or account password. The payment token is typically preloaded in a mobile payment device to allow payments to be processed without exposing actual account details that could potentially be compromised. However, when the preloaded token itself is compromised or when the issuer or user of the mobile payment device needs to change the tokenized amount information, conventionally there is no easy way to replace payment tokens to the mobile payment device. This is because the mobile payment device is often built to prevent physical access to its secure element or memory that stores the payment token, due to size constraints, security concerns, physical construction, etc. of the mobile payment device. Some mobile payment devices have wired or wireless network connectivity, such as Wi-Fi® receiver or micro-USB charging/data port, such that payment tokens can be provisioned to the device without requiring physical access to the device. But such extra network connectivity requires the mobile payment devices to have one or more of a power source (e.g., a battery), a charging port (for receiving a charging cable), or a data port (for receiving a data cable). The batteries and charging/data ports, however, increase the sizes and weights, and hence the portability of the mobile payment devices. Moreover, the batteries need to be frequently replaced or recharged, and the charging/data ports may easily trap dust and/or get damaged. In addition, as noted above, size constraints, security concerns, physical construction, etc. of the mobile payment devices may prevent such batteries or charging/data ports from being used. For example, it is not practical for a chip-based credit/debit card to provide a battery or charging/data port. Therefore, the batteries and ports typically required for mobile payment devices with replaceable tokens are ill-suited for mobile payment technology and prevent the mobile payment devices from wide acceptance by consumers due to their shortcomings.

In view of the shortcomings and problems with traditional mobile payment devices, an improved system and method for provisioning payment tokens to the mobile payment devices is desired.

SUMMARY

The disclosed embodiments include systems and methods configured to, for example, provide payment tokens to a batteryless mobile payment device. In particular, the batteryless mobile payment device may be wirelessly powered to form wireless communication with an external device, so as to receive the payment tokens from the external device. The wireless powering may be in the form of inductive powering, such as those provided by wireless charging pads used for wirelessly charging mobile phones. The disclosed systems may include, among other components, a mobile payment device and an inductive power device. The mobile payment device may have near-field communication (NFC) capability, allowing a payment token stored in the mobile payment device to be wirelessly transferred to a payment terminal. The mobile payment device may further include Bluetooth® or other network connectivity beyond the NFC technology. The mobile payment device may receive power from the inductive power device and activate the network connectivity beyond the NFC technology, such that the external device may provision a payment token and other payment account information to the mobile payment device. This way, the mobile payment device does not need internal power sources or charging/data ports to acquire a payment token. Accordingly, the mobile payment device can be made smaller, lighter, safer, and easier to use.

Consistent with the present embodiments, a batteryless payment device is disclosed. For example, the batteryless payment device may include a first communication system and a second communication system, the second communication system being a near-field-communication (NFC) system. The batteryless payment device may also include a power receiver coupled to the first communication system and configured to wirelessly receive power from an external device for powering the first communication system. The batteryless payment device may further include a controller configured to: when the first communication system is powered, establish, via the first communication system, a first wireless connection with a user device; receive, through the first wireless communication, a token from the user device; establish, via the second communication system, a second wireless connection with a payment terminal; and transmit, through the second wireless connection, the token to the payment terminal.

Consistent with the present embodiments, a payment system is disclosed. For example, the payment system may include an induction power device configured to generate a first induction field. The payment system may further include a batteryless payment device. The batteryless payment device may include a first communication system and a second communication system, the second communication system being a near-field-communication (NFC) system. The batteryless payment device may also include a power receiver coupled to the first communication system and configured to wirelessly receive power from the first induction field for powering the first communication system. The batteryless payment device may further include a controller configured to: when the first communication system is powered, establish, via the first communication system, a first wireless connection with a user device; receive, through the first wireless communication, a token from the user device; establish, via the second communication system, a second wireless connection with a payment terminal; and transmit, through the second wireless connection, the token to the payment terminal.

Consistent with the present embodiments, a method of provisioning a payment token and conducting a transaction using the payment token is disclosed. For example, the method may include receiving, by a power receiver, power wirelessly from an external device for powering a first communication system. The method may also include establishing, via the first communication system, a first wireless connection with a user device. The method may also include receiving, through the first wireless connection, a token from the user device. The method may also include establishing, via a second communication system, a near-field-communication (NFC) connection with a payment terminal. The method may also include. The method may further include transmitting, through the NFC connection, the token to the payment terminal.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Reference will now be made in detail to the disclosed embodiments, examples of which are illustrated in the accompanying drawings. Wherever convenient, the same reference numbers will be used throughout the drawings to refer to the same or like parts.

Figure 1:
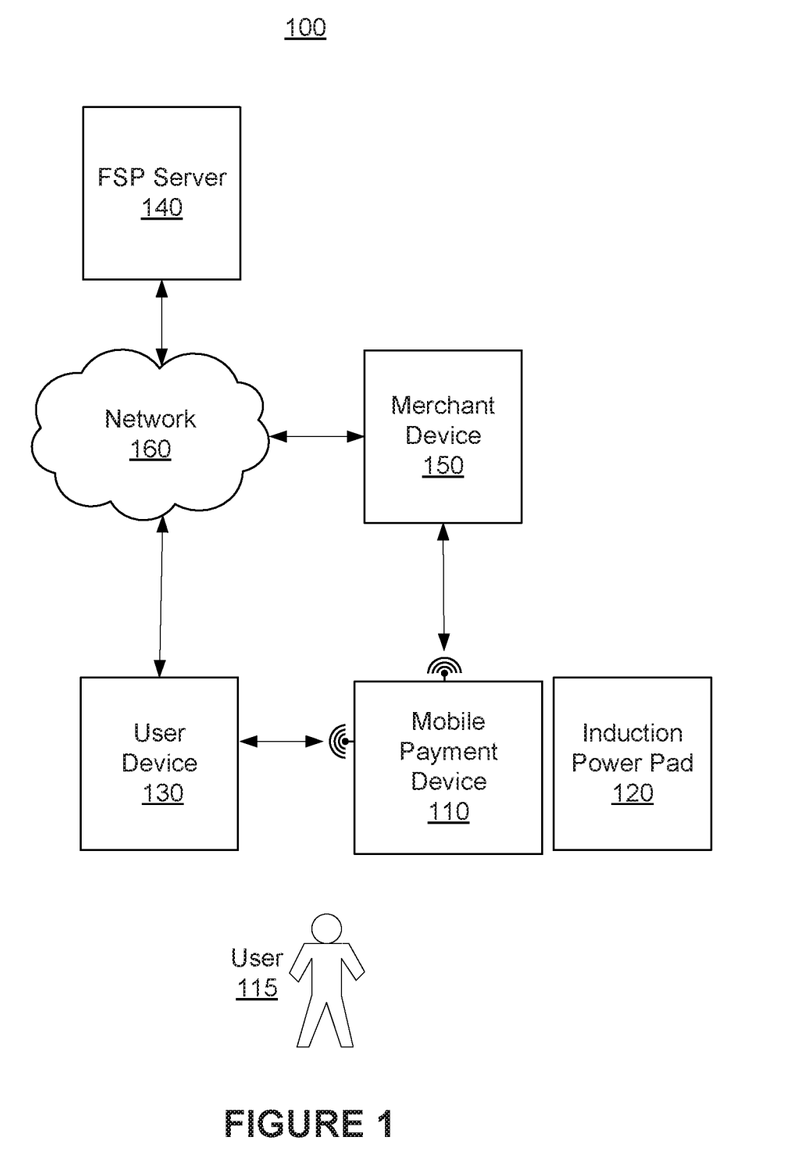
FIG. 1 is a block diagram of an exemplary system, consistent with disclosed embodiments.

FIG. 1 is a block diagram of an exemplary secure payment system 100 for performing one or more operations, consistent with the disclosed embodiments. In one embodiment, system 100 may include one or more mobile payment devices 110, one or more induction power pads 120, one or more user devices 130, one or more financial service provider (FSP) servers 140, and/or network 160. Consistent with disclosed embodiments, user 115 may be associated with a mobile payment device 110 and/or a user device 130. The components and arrangement of the components included in system 100 may vary. Thus, system 100 may include other components that perform or assist in the performance of one or more processes consistent with the disclosed embodiments.

Components of system 100 may be computing systems configured to provide methods and systems that enable the use of tokens (for example, a secure software and/or hardware mechanism that may be used to authorize operations) to conduct payment transactions, as well as provision payment tokens to mobile payment device 110 through Bluetooth® or other network connectivity beyond NFC technology, consistent with disclosed embodiments. As further described herein, components of system 100 may include one or more computing devices (for example, computer(s), server(s), etc.), memory storing data and/or software instructions (for example, database(s), memory device(s), etc.), and other known computing components. In some embodiments, the one or more computing devices may be configured to execute software instructions stored on one or more memory devices to perform one or more operations consistent with the disclosed embodiments. Components of system 100 may be configured to communicate with one or more other components of system 100, including systems associated with mobile payment device 110, user device 130, and/or FSP server 140. In certain aspects, users may operate one or more components of system 100 to initiate and provide input for one or more operations consistent with the disclosed embodiments.

Mobile payment device 110 may be any device configured to be worn or carried by a user, such as a user 115. For example, mobile payment device 110 may be embedded in or incorporated into a wearable item such as key fob, wristband, purse, jewelry (for example, bracelet, ring, necklace, etc.), eyeglasses, sunglasses, watch, piece of clothing (for example, shirt, shoe, pants, jacket, etc.), etc. Mobile payment device 110 may include an attachment device (for example, a clip) to allow it to be attached to a wearable item (for example, belt). Mobile payment device 110 may also be embedded in or incorporated into an item that is normally carried by a user or held in the user's pocket (for example, smartphone, wallet, financial card, key, key ring, etc.). In some embodiments, mobile payment device 110 may be a component of or incorporated into a commercially available wearable computing device, such as a smartwatch, a pair of smart glasses, etc.

As described in greater detail below, mobile payment device 110 may be communicatively coupled to user device 130 using, for example a secure, low power wireless technology, such as Bluetooth® Low Energy (BLE) technology to enable communication between mobile payment device 110 and user device 130. A detailed explanation of BLE may be found in the Bluetooth® Low Energy Technology Specification version 4.1 and 4.0 and other related BLE specifications, the entire contents of which are incorporated herein by reference.

In exemplary embodiments, BLE may operate in the 2.4 GHz industrial, scientific, and medical (ISM Band) band. BLE may support very short data packets (for example, 8 octets minimum up to 27 octets maximum) that are transferred at, for example 1 Mbps. The BLE connections may use advanced sniff-sub rating to achieve ultra-low duty cycles. The BLE technology also may use the adaptive frequency hopping, common to all versions of Bluetooth® technology, to minimize interference from other technologies in the 2.4 GHz ISM Band. The BLE technology may enable efficient multi-path benefits that increase the link budgets and range. The BLE technology also can support connection setup and data transfer as low as 3 ms, allowing an application to form a connection and then transfer authenticated data in few milliseconds for a short communication burst before quickly tearing down the connection. Moreover, increased modulation index provides a possible range for BLE technology of over 100 meters. The BLE technology may use a 24 bit cyclic redundancy check (CRC) on packets to ensure the maximum robustness against interference. The BLE technology may include full Advanced Encryption Standard-128 (AES-128) encryption using continuity check message ("CCM") to provide encryption and authentication of data packets. The BLE technology may be optimized for one-to-one connections while allowing one-to-many connections using, for example, a star topology.

It is contemplated that BLE is used for illustrative purpose only. The present disclosure does not limit the wireless protocols used for coupling mobile payment device 110 and user device 130. For example, mobile payment device 110 may also be coupled to user device 130 using Wi-Fi® based on the IEEE 802.11 standard (operating at 2.4 GHz, 3.6 GHz, 5 GHz, 60 GHz, etc. frequency bands), or using ZigBee® based on the IEEE 802.15.4 standard (operating at 915 MHz, 2.4 GHz, etc. frequency bands).

In exemplary embodiments, mobile payment device 110 may have no internal power supply. To activate the BLE communication, mobile payment device 110 may be powered through wireless charging. For example, the wireless charging may be in the form of inductive charging that uses an electromagnetic field to transfer energy from induction power pad 120 to mobile payment device 110. Induction power pad 120 may include an induction coil configured to create an alternating electromagnetic field in the vicinity of induction power pad 120. Correspondingly, mobile payment device 110 may include an induction antenna configured to couple with the electromagnetic field and receive the energy in the electromagnetic field.

In practice, to receive the induction power, mobile payment device 110 may be placed in a close distance to induction power pad 120, as specified by the manufacturer of induction power pad 120. For example, mobile payment device 110 may be directly placed on induction power pad 120. Upon receiving the induction power, mobile payment device 110 may activate the BLE connectivity and establish the BLE communication with user device 130. Subsequently, through the BLE connection, user device 130 may transmit payment credentials, including payment tokens, to mobile payment device 110 for use in, for example, conducting a financial transaction. The payment credential may be pre-stored in user device 130, or obtained by user device 130 from FSP server 140 through network 160. After the credential provisioning is completed, the BLE connection may be disabled. Accordingly, mobile payment device 110 is no longer needed to be powered by induction power pad 120 and can be carried away from induction power pad 120.

User device 130 may be one or more computing devices configured to perform one or more operations consistent with disclosed embodiments. User device 130 may be a desktop computer, a laptop, a server, a mobile device (for example, tablet, smart phone, etc.), or any other type of computing device. For exemplary purposes, aspects of the disclosed embodiments are described with reference to user device 130 as a mobile client device, such as a smart phone, a tablet, or the like. As mentioned herein, however, the disclosed embodiments are not limited to such examples. For example, user device 130 could be a laptop, a desktop, or any other device.

User device 130 may include one or more processors configured to execute software instructions stored in memory, such as memory included in user device 130. User device 130 may include software that when executed by a processor performs known Internet-related communications, content display processes, and/or disclosed token provision processes. For instance, user device 130 may execute browser or related mobile display software that generates and displays interfaces including content on a display device included in, or in communication with, user device 130. User device 130 may be a mobile device that executes mobile device applications and/or mobile device communication software that allows user device 130 to communicate with other components of system 100 over network 160, and generates and displays content in interfaces via a display device included in user device 130. The disclosed embodiments are not limited to any particular configuration of user device 130. For instance, user device 130 may be a mobile device that stores and executes mobile applications that configure the mobile device to receive and/or provide token information.

User device 130 also includes a communication component(s) configured to facilitate communication, wired and/or wirelessly, between user device 130 and other devices, such as mobile payment device 110 and FSP server 140. The communication component can access a wireless network based on a communication standard, such as WiFi, 2G, 3G, 4G, 5G, LTE, or a combination thereof. In one exemplary embodiment, the communication component receives a broadcast signal or broadcast associated information from an external broadcast management system via a broadcast channel. In one exemplary embodiment, the communication component further includes a NFC module to facilitate short-range communications. For example, the NFC module may be implemented based on a Near Field Communication (NFC) technology, radio frequency identification (RFID) technology, an infrared data association (IrDA) technology, an ultra-wideband (UWB) technology, a Bluetooth® technology, and other technologies. In particular, consistent with the disclosed embodiments, the communication component can establish a BLE connection with mobile payment device 110, so as to enable the provision of payment tokens.

A financial service provider (not shown) may be an entity that provides, maintains, manages, or otherwise offers financial services. For example, financial service provider may be a bank, credit card issuer, or any other type of financial service entity that generates, provides, manages, and/or maintains financial service accounts for one or more cardholders. Financial service accounts may include, for example, credit card accounts, loan accounts, checking accounts, savings accounts, reward or loyalty program accounts, and/or any other type of financial service account known to those skilled in the art. Financial service provider may include infrastructure and components that are configured to generate and/or provide financial service accounts such as credit card accounts, checking accounts, debit card accounts, loyalty or reward programs, lines of credit, or the like.

For example, a financial service provider may include one or more FSP servers 140. In one aspect, FSP server 140 may be one or more computing devices configured to perform one or more operations consistent with disclosed embodiments. For example, FSP server 140 may be configured to providing provision services for payment tokens, consistent with disclosed embodiments. In one aspect, FSP server 140 may be a desktop computer, a server, or any other type of computing device. FSP server 140 may include one or more processors configured to execute software instructions stored in memory. The one or more processors may be configured to execute software instructions to perform Internet-related communication and financial service-based processes.

A merchant (not shown) may be an entity that offers goods, services, and/or information, such as a retailer (for example, Starbucks®, Macy's®, Target®, etc.), a grocery store, a service provider (for example, a utility company, etc.), or any other type of entity that offers goods, services, and/or information that consumers (for example, end-users or other business entities) may purchase, consume, use, etc. In one example, a merchant may be associated with a merchant brick-and-mortar location that a user (for example, user 115) may physically visit and purchase a product or service. The merchant may also include back- and/or front-end computing components that store data and execute software instructions to perform operations consistent with disclosed embodiments, such as computers that are operated by employees of the merchant (for example, back office systems, etc.).

The merchant may include merchant device 150. Merchant device 150 may include one or more computing systems, such as server(s), desktop computer(s), point-of-sale (POS) device(s), etc., that are configured to execute stored software instructions to perform operations associated with a merchant, including one or more processes associated with processing purchase transactions, generating transaction data, generating product data (for example, stock-keeping-unit (SKU) data) relating to purchase transactions, etc. Merchant device 150 may perform one or more operations consistent with the disclosed embodiments. The disclosed embodiments are not limited to any particular configuration of merchant device 150. As one example, merchant device 150 may be a POS system like a cash register. Merchant device 150 may comprise functionality and/or hardware operable to receive wireless communications from mobile payment device 110 and/or user device 130. For example, merchant device 150 may be configured to utilize technologies such as NFC, RFID, infrared, electric field, magnetic fields, or other technologies, in order to initiate and/or process a purchase or other transaction.

Merchant device 150 may also generate and send token authorization requests to systems, such as FSP server 140. For example, merchant device 150 may receive a token from mobile payment device 110 as part of a payment transaction for services and/or goods rendered, and merchant device 150 may send the token (along with other information) to FSP server 140 to complete a payment transaction. Thus, merchant device 150 may also generate and send transaction requests to FSP server 140. Such transaction requests may comply with International-Standardization-for-Organization (ISO) 8583 standards. For example, upon receiving financial account information associated with the token, merchant device 150 may generate an ISO 8583 message to FSP server 140 indicating that an account holder would like to make a debit payment for the purchase price of the rendered good or service.

Merchant device 150 may include a contactless payment terminal (not shown) comprising any known NFC device designed to communicate (directly or indirectly) with other components of system 100. For example, the contactless payment terminal (CPT) may be a POS terminal, an automated teller machine (ATM), or any other device that is configured to communicate with NFC mobile devices (for example, mobile payment device 110 and/or user device 130) to facilitate a financial transaction according to disclosed embodiments.

Network 160 may be any type of network configured to provide communications between components of system 100. For example, network 160 may be any type of network (including infrastructure) that provides communications, exchanges information, and/or facilitates the exchange of information, such as the Internet, a Local Area Network (LAN), a Wide Area Network (WAN), a cellular network, IEEE Ethernet 902.3, fiber optics, telephone lines, wireless networks (for example, a Wi-Fi®/802.11 network), NFC, magnetic fields, an optical code scanner, infrared, or other suitable connection(s) that enable the sending and receiving of information between the components of system 100. In other embodiments, one or more components of system 100 may also communicate directly through a dedicated communication link(s).

In addition, network 160 may further include one network, or any number of exemplary types of networks mentioned above, operating as a stand-alone network or in cooperation with each other. Network 160 may utilize one or more protocols of one or more communicatively-coupled network elements. Although network 160 is depicted as a single network, it should be appreciated that according to one or more embodiments, network 160 may comprise a plurality of interconnected networks, such as, for example, the Internet, a service provider's network, a cable television network, corporate networks, and home networks.

Figure 2:
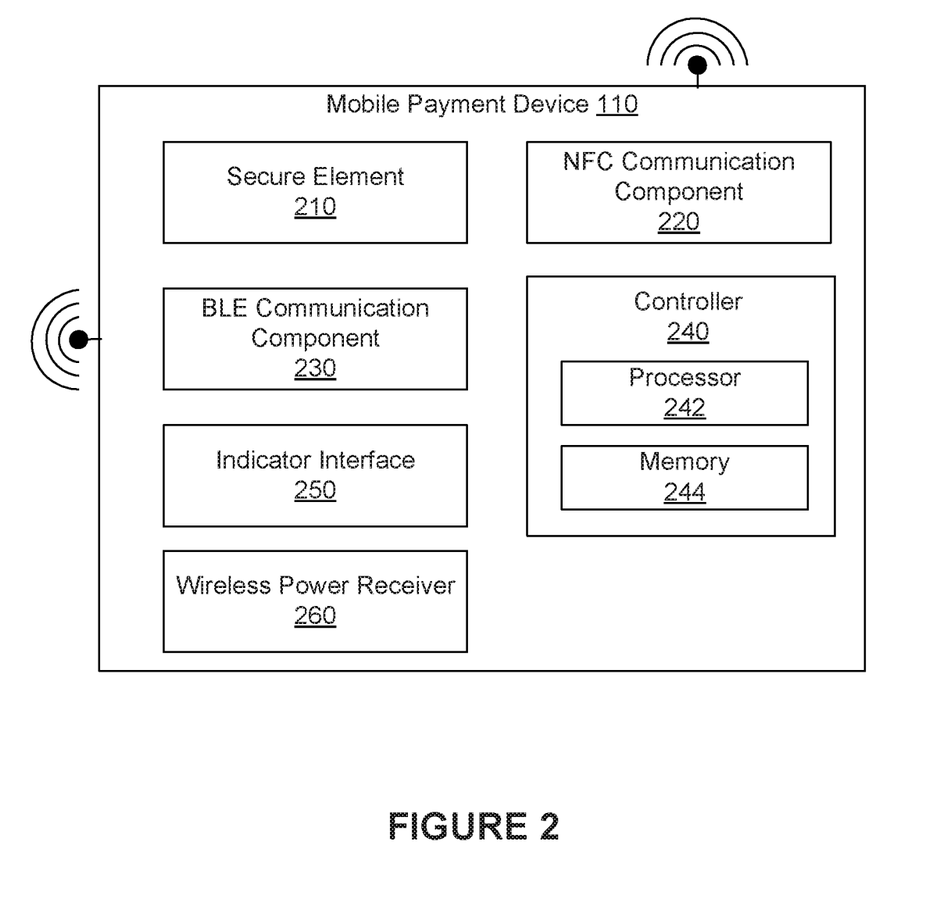
FIG. 2 is a block diagram of an exemplary mobile payment device, consistent with disclosed embodiments.

FIG. 2 depicts an exemplary mobile payment device 110, consistent with disclosed embodiments. In some embodiments, mobile payment device 110 may include components that may execute one or more processes to receive from user device 130 a token associated with a financial account. In some embodiments, mobile payment device 110 may also include components that may execute one or more processes to initiate a financial transaction by transmitting the token to merchant device 150. As shown in FIG. 2, mobile payment device 110 may include one or more of a secure element 210, a NFC communication component 220, a BLE communication component 230, a controller 240, an indicator interface 250, and a wireless power receiver 260. Some or all of the components may be combined into one chip, spread among multiple chips or circuits, or any other possible combination.

Secure element 210 may be configured to provide an environment in which processes and data may be securely stored and/or executed. In one embodiment, secure element 210 may be a separate embedded device that includes a universal integrated circuit card (UICC), a secure digital or other memory card, a Subscriber Identity Module (SIM) card, a microcontroller, a computer processor, or any other possible implementation. In another embodiment, secure element 210 may be software located in a memory in mobile payment device 110. For example, secure element 210 may provide delimited memory for applications operating according to disclosed embodiments. In certain embodiments, secure element 210 may be configured and operate as known secure elements for NFC devices. For example, secure element 210 may store applications, payment credentials (for example, tokens), and/or other information associated with secure execution of applications. Secure element 210 may include one or multiple error detection systems, tamperproof storage modules, execution memory modules. Secure element 210 may represent multiple secure elements used to isolate various applications and provide additional security. Secure element 210 may optionally be removable to facilitate ease of use.

NFC communication component 220 may include an antenna and a NFC controller. NFC communication component 220 and secure element 210 may be connected, for example, via a Single Wire Protocol (SWP) interface, Signal-In/Signal-Out Connection (S2C) interface, etc.

BLE communication component 230 may include a Bluetooth® radio capable of performing low-energy secure wireless communication with user device 130 using the BLE technology. This Bluetooth® radio may cooperate with other components of mobile payment device 110, such as controller 240, to enable the Bluetooth® communication. BLE communication component 230 may be capable of decoding data received from user device 130. BLE communication component 230 may also be capable of encoding data to be sent to user device 130. BLE communication component 230 may include one module or multiple modules, and may be optionally combinable with one or both of the secure element 210 and NFC communication component 220. BLE communication component 230 may be capable of communicating with the user device 130 by using a host controller interface. For example, and not by way of limitation, BLE communication component 230 may use a Java™ Contactless Communication API (JSR 257), a Java™ Security and Trust Services API (JSR 177), Security and Trust Services API (SATSA), an ISO/IEC 7816 compatible interface, or any other acceptable means or protocol to communicate with user device 130 or any other devices.

It is contemplated that BLE communication component 230 is only one example for enabling the communication between mobile payment device 110 and user device 130. Mobile payment device 110 may include other communication components, in place of or in addition to BLE communication component 230, to perform any other types of low-energy secure communication with user device 130, such as Wi-Fi® or infrared communication.

Secure element 210, NFC communication component 220, and BLE communication component 230 may be connected in parallel, in series, or any other possible combination. Secure element 210 and NFC communication component 220 may each maintain a connection to BLE communication component 230, if desired. In some embodiments, only one of secure element 210 and NFC communication component 220 may maintain a connection to BLE communication component 230 to enhance security.

Controller 240 may control various operations of mobile payment device 110. For example, controller 240 may include specific capabilities to enable Bluetooth® technology, such as, the BLE technology, and cooperate with the other components of mobile payment device 110 to communicate with user device 130. Controller 240 may also execute the NFC-related operations.

In certain embodiments, controller 240 may include one or more processors 242 and memories 244 for performing functions consistent with the disclosed embodiments. Processor 242 may include one or more known processing devices, from microcontrollers configured to process simple logic commands, such as PIC™ microcontrollers, MIPS™ microcontrollers, etc., to more powerful microprocessors including the Pentium™ or Xeon™ family manufactured by Intel™, the Turion™ family manufactured by AMD™, etc. The disclosed embodiments are not limited to any type of processor(s) configured in mobile payment device 110.

Memory 244 may include one or more storage devices configured to store information. For example, in some embodiments, memory 244 may store instructions that may be executed by a processor, such as processor 242. Memory 244 may store data that may reflect any type of information in any format that system 100 may use to perform operations consistent with the disclosed embodiments.

In some embodiments, processor 242 may execute one or more programs stored by memory 244. For example, processor 242 may execute a transaction program configured to provide a token stored in secure element 210 to a merchant device 150 (for example, a POS device) when user 115 operates mobile payment device 110 to complete a financial transaction.

Indicator interface 250 may be coupled to an indicator to provide status indications to a user of mobile payment device 110. For example, indicator interface 250 may operate one or more light-emitting diodes (LEDs) on the surface of mobile payment device 110 to provide illuminated status indications. In one embodiment, a solid or flashing green LED indicator may indicate that mobile payment device 110 is communicating with user device 130 and a solid or flashing red LED indicator may indicate that mobile payment device 110 is experiencing one or more problems, such as a communication failure, power failure, and the like. Indicator interface 250 may receive status signals from controller 240 and/or other components of mobile payment device 110, for example, BLE communication component 230, and use those status signals to activate one or more indicators.

Wireless power receiver 260 may include an induction antenna configured to receive power from induction power pad 120. Induction power pad 120 may be any commercially available induction charging pad, such as those employed to wirelessly charge smart phones. Alternatively, induction power pad 120 may be specially designed for being paired with mobile payment device 110. When mobile payment device 110 is brought close to and/or in contact with induction power pad 120, the induction antenna in wireless power receiver 260 may couple with the induction field generated by induction power pad 120 and collect the energy from the induction field. Wireless power receiver 260 may also include one or more capacitors and/or inductors, collectively forming the impedance of wireless power receiver 260, to facilitate the storing and releasing of the received energy.

Wireless power receiver 260 may be coupled with one or more one or more components of mobile payment device 110 and supply the received energy to these components to power various operations by mobile payment device 110. In one embodiment, the received energy may be used to power BLE communication component 230 and/or controller 240 to perform the BLE communication with user device 130.

Figure 3A:
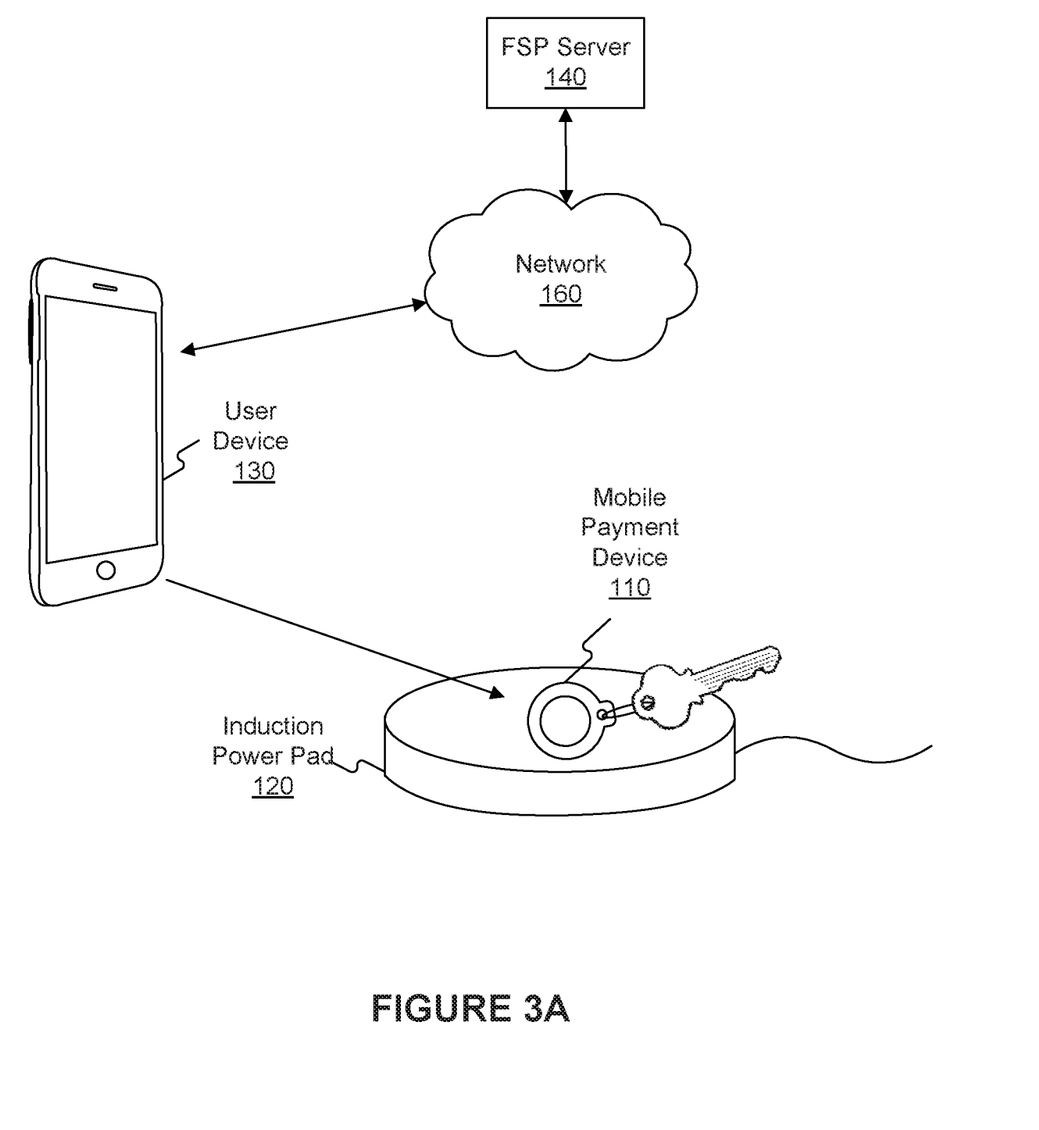
FIG. 3A is a schematic diagram illustrating an exemplary implementation of wireless powering for provisioning of payment credential, consistent with the disclosed embodiments.

FIG. 3A is a schematic diagram illustrating an exemplary implementation of wireless powering for provisioning of payment credential, consistent with the disclosed embodiments. In the example depicted in FIG. 3A, mobile payment device 110 is a key chain, user device 130 is a smart phone, and merchant device 150 is a contactless POS terminal.

Referring to FIG. 3A, when the need or desire to provision (or reprovision) a payment credential (such as, for example, a token) to payment device 110 arises, user 115 places mobile payment device 110 on induction power pad 120. Wireless power receiver 260 may sense the induction field generated by induction power pad 120 and draws energy from the induction field to power BLE communication component 230 and/or controller 240. User device 130 may also detect the Bluetooth® signal emitted by BLE communication component 230 and establish a BLE connection with BLE communication component 230. User device 130 may also transmit a token to mobile payment device 110. The token may be obtained by user device 130 from FSP server 140 through network 160. Alternatively, the token may be pre-stored in or generated by user device 130. After successfully receiving the token, controller 240 may save the token in secure element 210 for future use. In one embodiment, controller 240 may generate feedback regarding whether the token has been successfully received and stored. For example, controller 240 may send a message to user device 130 reporting the status of the reception and storage of the token in secure element 210. For another example, controller 240 may send a signal to indicator interface 250, so that indicator interface 250 drives an indicator, for example, a LED light, to indicate whether the token is received.

User 115 may move mobile payment device 110 away from induction power pad 120, for example, after the mobile payment device 110 receives the token. Accordingly, BLE communication component 230 and/or controller 240 may become deactivated, and the BLE connection between mobile payment device 110 and user device 130 may cut off. For example, when the mobile payment device 100 is removed from induction power pad 120, BLE communication component 230 and/or controller 240 may cease to receive power (or enough power) to continue operations.

Figure 3B:
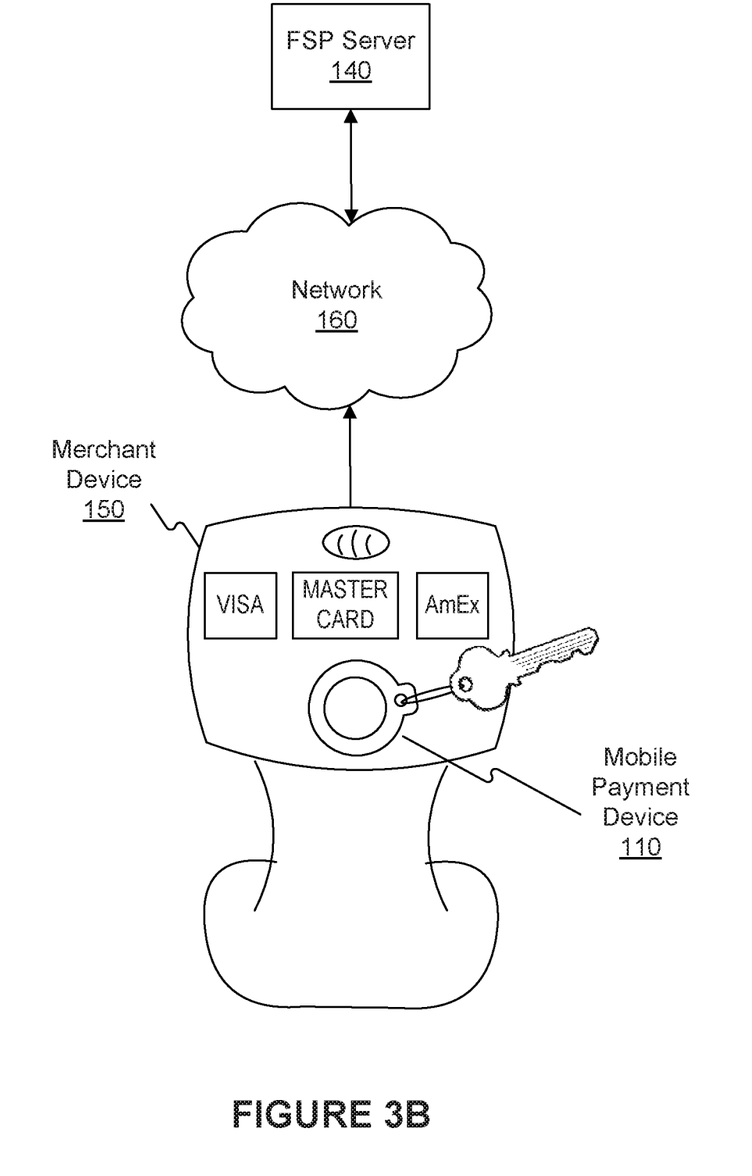
FIG. 3B is a schematic diagram illustrating an exemplary implementation of mobile payment using the payment credential provisioned in FIG. 3A, consistent with the disclosed embodiments.

FIG. 3B is a schematic diagram illustrating an exemplary implementation of mobile payment using the payment credential provisioned in FIG. 3A, consistent with the disclosed embodiments. Referring to FIG. 3B, user 115 may bring mobile payment device 110 close to or in contact with merchant device 150. Merchant device 150 may include a NFC reader, which may communicate with NFC communication component 220 by using radio waves or other short-range wireless technology. This way, the token in secure element 210 may be transmitted to merchant device 150 via, for example, NFC communication. For example, in exemplary embodiments, mobile payment device 110 may draw power from, for example, the NFC reader associated with merchant device 150 in order to perform the NFC communication. Although not enough to power the BLE communication, the typical power settings of merchant device 150 may create an induction field capable of driving the NFC communication. Therefore, mobile payment device 110 does not require an internal power source for performing either BLE or NFC communications. After receiving the token through the NFC communication, merchant device 110 may transmit the token, together with other account and transaction related information, to FSP server 140 through network 160. If the information can be verified, FSP server 140 may send a confirmation to merchant device 150 authorizing the transaction.

As illustrated in FIGS. 3A and 3B, mobile payment device 110 may draw power wirelessly from induction power pad 120, acquire a payment token from user device 130 by wireless communication, and transmit the acquired payment token to merchant device 150. Embodiments of the disclosed processes do not require mobile payment device 110 to carry an internal power source and/or use power/data cables. Therefore, mobile payment device 110 can be made smaller and lighter, and may be easier and less expensive to be embedded in other devices/objects, e.g., wearable devices, key fobs, purses, clothing, etc. Moreover, the disclosed processes allow user 115 or the financial service provider to conveniently provision or reprovision a payment token to mobile payment device 110, without using batteries or charging/data cables, or physically accessing mobile payment device 110. As such, the disclosed processes not only make mobile payment device 110 more user friendly, but also improve the security of mobile payment technology because any payment tokens in mobile payment device 110 can be conveniently updated as needed and as frequently as possible.

Figure 4:
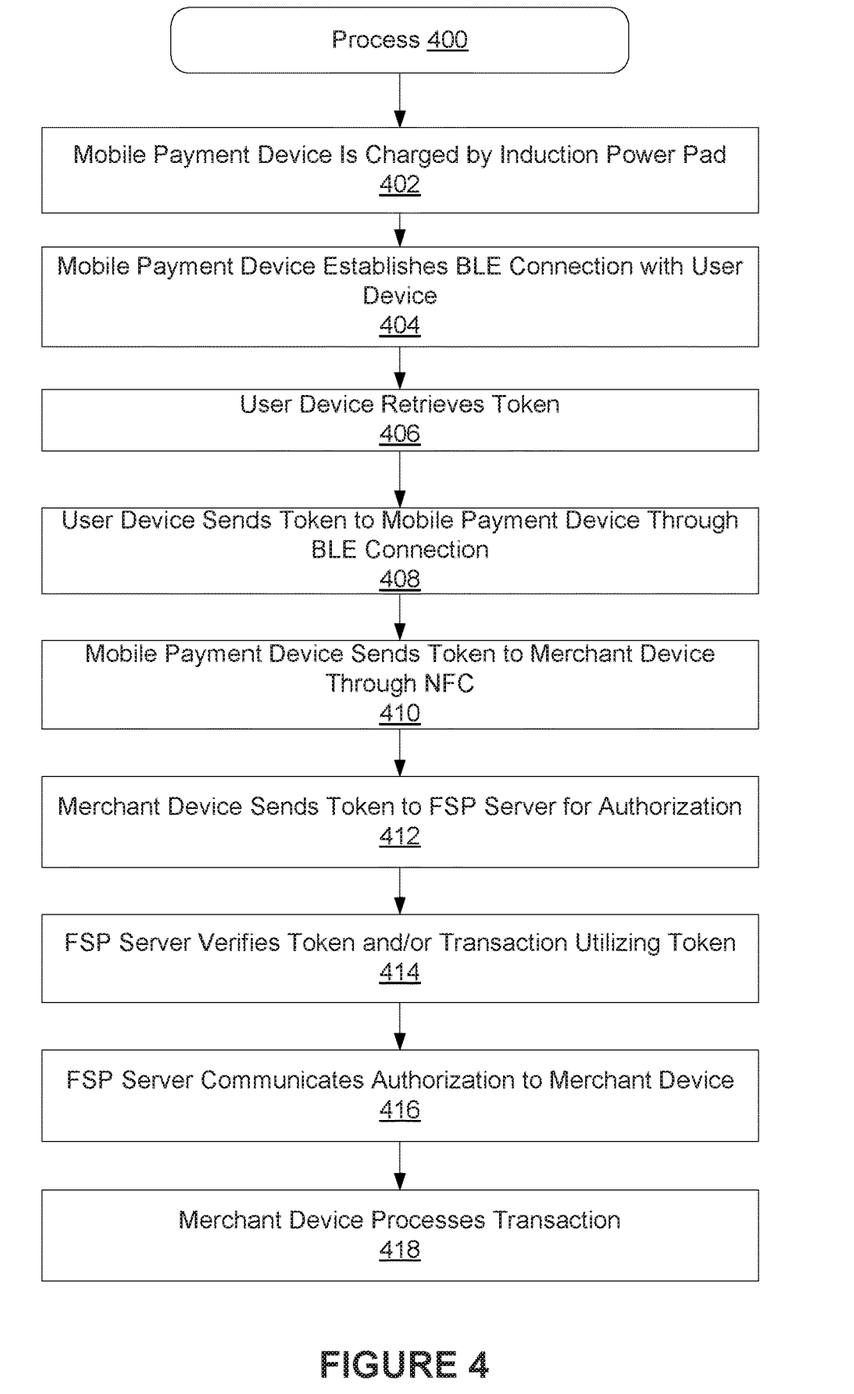
FIG. 4 is a flowchart of an exemplary payment token provisioning and secure payment method, consistent with disclosed embodiments.

FIG. 4 is a flowchart of a method 400 performed by secure payment system 100, consistent with disclosed embodiments. For illustrative purposes only, in the following description, both mobile payment device 110 and user device 130 are operated by user 115.

In step 402, mobile payment device 110 may be brought within the electromagnetic field of induction power pad 120 to power one or more components of mobile payment device 110. For example, when mobile payment device 110 is placed close to or in contact with induction power pad 120, wireless power receiver 260 may automatically receive power from the electromagnetic field generated by induction power pad 120, and use the power to activate BLE communication component 230.

In step 404, mobile payment device 110 may establish the BLE connection with user device 130. For example, user device 130 may be BLE-enabled and configured with a mobile payment application. The mobile payment application may enable user device 130 to automatically detect the BLE signals emitted by BLE communication component 230 and form the BLE connection with mobile payment device 110 according to a predetermined communication protocol. In one embodiment, user 115 may be required to input a password or other credentials in the mobile payment application to validate the BLE connection, for example, to ensure data security.

In step 406, user device 110 may retrieve a token. For example, user 115 may operate the mobile payment application installed on user device 130 to initiate an operation for provisioning a token to mobile payment device 110. The token may include an identifier corresponding to and/or substituting for confidential account information, such as confidential account information that may be transferred in during a swipe transaction of a magnetic-stripe based credit/debit card. User device 130 may send a request for the token to (or access the token from) FSP server 140 through network 160. Subsequently, FSP server 140 may generate the token and send the token to user device 130.

As described above, alternatively, user device 130 may pre-store and/or generate one or more tokens associated with one or more accounts. The mobile payment application may display the list of pre-stored tokens on a screen of user device 130. User 115 may select (e.g., on user device 130) a token to be provided to mobile payment device 110. In some embodiments, a list of different accounts may be displayed, and a token may be generated based on the selection of an account from the list.

In step 408, user device 110 may send the token to mobile payment device 110 through the BLE connection. In some embodiments, user 115 may operate user device 130 to initiate sending of the retrieved token to mobile payment device 110 through the BLE connection. After the token is successfully transmitted to mobile payment device 110, user device 130 may display a confirmation message. Alternatively, mobile payment device 110 may control an indicator, such as a LED indicator on mobile payment device 110, to indicate whether the token is successfully provisioned to mobile payment device 110.

In some embodiments, mobile payment device 110 may store the received token in secure element 210 for future use. The token may be one or more of single-use token(s), multi-use token(s), token(s) configured for use at a particular merchant, token(s) configured for use with one or more particular types of transactions, token(s) associated with spending restrictions, etc.

In step 410, mobile payment device 110 may send the token to merchant device 150 through a wireless connection, for example, using NFC. This step may be performed, for example, at the time of purchase. In some embodiments, upon receipt of the token, merchant device 150 may format the token into a data format consistent with one of several authorization networks. For example, an exemplary 6-digit token may be inserted into one of the "tracks" of data utilized by the Visa® network to transmit and receive transaction data. Also, as noted above, the token provided may also use a format consistent with standard financial card account information, such as the information that would be transferred by a credit card swipe.

In step 412, merchant device 150 may send the token to FSP server 140 for authorization. For example, merchant device 150 may send the token to FSP server 140 through network 160. In one embodiment, the information sent to FSP server 140 may include the tokenized information representing a financial account with the amount of the transaction and/or other information necessary to process a transaction request.

In step 414, FSP server 140 may verify the token and/or transaction. For example, FSP server 140 may use the token to look up the account of user 115 and determine whether the transaction should be authorized. FSP server 140 may check the token against certain parameters to determine, for example, whether the transaction complies with certain parameters, whether the token has expired, etc. In various embodiments, FSP server 140 may receive and utilize location information or identification information associated with user device 130 to determine whether to authorize the transaction. For example, FSP server 140 may receive and utilize the MAC address of user device 130 and/or the merchant location to determine whether to authorize the transaction.

In step 416, if the token and/or transaction can be verified, FSP server 140 may communicate the authorization to merchant device 150. Otherwise, FSP 140 may inform merchant device 150 that the transaction cannot be authorized. In step 418, merchant device 150 may process or reject the transaction according to the feedback from FSP server 140.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various programs or program modules can be created using a variety of programming techniques. For example, program sections or program modules can be designed in or by means of Java, C, C++, assembly language, Python, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (for example, of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A batteryless payment device, comprising:
a wireless power component;
a Bluetooth Low Energy (BLE) communication component;
a secure element;
a near-field communication (NFC) component; and
a controller comprising at least one processor and a memory,
wherein:
the wireless power component is configured to receive power from an induction power device and power the BLE communication component and the controller,
the BLE communication component, when powered by the wireless power component, is configured to establish a BLE connection with a user device and deactivate after the controller receives a token,
the NFC communication component is configured to receive power from a merchant device and, when powered by the merchant device, establish an NFC connection with the merchant device, and
the memory stores executable instructions that, when executed by the at least one processor, cause the at least one processor to perform operations comprising:
receiving the token from the user device over the established BLE connection;
saving the token in the secure element; and
transmitting the token from the secure element to the merchant device over the established NFC connection.

2. The batteryless payment device of claim 1, wherein the wireless power component comprises an induction antenna.

3. The batteryless payment device of claim 1, wherein the NFC component is further configured to receive power from an induction field of the merchant device.

4. The batteryless payment device of claim 1, wherein the token comprises encrypted information corresponding to a financial account.

5. The device of claim 1, further comprising an indicator configured to provide an indication of the operating status of at least one of the wireless power component, the BLE communication component, the NFC component, or the controller.

6. A payment system, comprising:
an induction power device configured to generate an induction field; and
a batteryless payment device, comprising:
a wireless power component;
a Bluetooth Low Energy (BLE) communication component;
a secure element;
a near-field communication (NFC) component; and a controller comprising at least one processor and a memory, wherein:
- the wireless power component is configured to receive power from the induction power device and power the BLE communication component and the controller,
- the BLE communication component, when powered by the wireless power component, is configured to establish a BLE connection with a user device and deactivate after the batteryless payment device receives a token,
- the NFC communication component is configured to receive power from a merchant device and, when powered by the merchant device, establish an NFC connection with the merchant device, and
- the memory stores executable instructions that, when executed by the at least one processor, cause the at least one processor to perform operations comprising:
  - receiving the token from the user device over the established BLE connection;
  - saving the token in the secure element; and
  - transmitting the token from the secure element to the merchant device over the established NFC connection.

7. The system of claim 6, wherein the wireless power component comprises an induction antenna.

8. The system of claim 6, further comprising the user device, wherein the user device is configured to generate the token and transmit the token to the batteryless payment device.

9. The system of claim 6, wherein the NFC component is further configured to receive power from an induction field of the merchant device.

10. The system of claim 6, wherein the induction power device comprises an induction power pad.

11. The system of claim 6, wherein the token comprises encrypted information corresponding to a financial account.

12. The system of claim 6, wherein the batteryless payment device further comprises an indicator configured to provide an indication of the operating status of the batteryless payment device.

13. The system of claim 12, wherein the indicator is a light-emitting diode.

14. The system of claim 6, wherein the memory further stores executable instructions that, when executed by the at least one processor, cause the at least one processor to perform operations comprising generating feedback to the user device regarding whether the token has been received over the established BLE connection.

15. The system of claim 12, wherein the indication indicates at least one of a receipt of the token, a communication failure, or a power failure.

16. A method of conducting a financial transaction using a batteryless payment device comprising a wireless power component, a Bluetooth Low Energy (BLE) communication component, a secure element, a near-field communication (NFC) component, and a controller including at least one processor and a memory, the method comprising:
- receiving, by the wireless power component, power from an induction power device;
- powering, by the wireless power component using the received power, the BLE communication component;
- establishing, by the powered BLE communication component, a BLE connection with a user device;
- receiving, by the controller, a token from the user device over the established BLE connection;
- saving, by the controller, the token in the secure element;
- deactivating the BLE communication component after the batteryless payment device receives the token;
- receiving, by the NFC component, power from a merchant device;
- establishing, by the powered NFC component, an NFC connection with the merchant device; and
- transmitting, by the controller, the token from the secure element to the merchant device over the established NFC connection.

17. The method of claim 16, wherein the wireless power component comprises an induction antenna.

18. The method of claim 16, wherein receiving power from the merchant device comprises receiving power from an induction field of the merchant device.

* * * * *